(12) United States Patent
Genoud et al.

(10) Patent No.: US 7,631,536 B2
(45) Date of Patent: Dec. 15, 2009

(54) CALIBRATION WEIGHT ARRANGEMENT FOR AN ELECTRONIC BALANCE

(75) Inventors: Dominique Genoud, Uster (CH); Thomas Köppel, Oetwil am See (CH); Jean-Christophe Emery, Zürich (CH)

(73) Assignee: Mettler-Toledo AG, Greifensee (CH)

( * ) Notice: Subject to any disclaimer, the term of this patent is extended or adjusted under 35 U.S.C. 154(b) by 460 days.

(21) Appl. No.: 11/462,732

(22) Filed: Aug. 7, 2006

(65) Prior Publication Data

US 2007/0034422 A1 Feb. 15, 2007

(30) Foreign Application Priority Data

Aug. 10, 2005 (EP) .................................. 05107333

(51) Int. Cl.
*G01L 25/002* (2006.01)
(52) U.S. Cl. ........................................................ 73/1.13
(58) Field of Classification Search .................. 73/1.08, 73/1.12, 1.15, 1.13
See application file for complete search history.

(56) References Cited

U.S. PATENT DOCUMENTS

| 3,101,075 | A | | 8/1963 | Johmann | |
|---|---|---|---|---|---|
| 4,566,548 | A | | 1/1986 | Sodler | |
| 4,626,094 | A | * | 12/1986 | Saito | 396/256 |
| 4,766,965 | A | * | 8/1988 | Luchinger | 177/50 |
| 5,148,881 | A | | 9/1992 | Leisinger | |
| 6,194,672 | B1 | | 2/2001 | Burkhard | |
| 6,851,260 | B2 | | 2/2005 | Mernoe | |

FOREIGN PATENT DOCUMENTS

DE 20119525 U1 5/2003
EP 0020030 A1 12/1980

OTHER PUBLICATIONS

Breidert, J. and Jansen, S., Keep It Simple: Kosmak and iLiros, Rubin Feb. 2001, vol. 11, Winter semester 2001.

* cited by examiner

*Primary Examiner*—Robert R Raevis
(74) *Attorney, Agent, or Firm*—Standley Law Group LLP

(57) ABSTRACT

The calibration weight arrangement for an electronic balance (1) with a force-measuring cell (6) has a calibration weight (14) which can be coupled to the force-measuring cell (6). A transfer mechanism and a drive source are used to move the calibration weight vertically, in order to establish, as well as to release, the force-transmitting contact between the calibration weight and the force-measuring cell. The transfer mechanism has at least one resetting element (122), a lifting system (110) configured as a knee-joint linkage (117), and a multi-stable positioning element (115). Due to the feedback from the multi-stable positioning element, whose first stable state defines the calibrating position (132) and whose second stable state defines the rest position (133) of the transfer mechanism, the actuator (118) is energized only during the phases when the transfer mechanism is moving.

18 Claims, 5 Drawing Sheets

CALIBRATION WEIGHT ARRANGEMENT FOR AN ELECTRONIC BALANCE

CROSS-REFERENCE TO RELATED APPLICATIONS

The present application claims a right of priority under 35 USC §119 from European patent application 05 107 333.6, filed 10 Aug. 2005, the content of which is incorporated by reference as if fully recited herein.

TECHNICAL FIELD

The invention relates to a calibration weight arrangement for a gravimetric measuring instrument, specifically for an electronic balance, and it relates in particular to a transfer mechanism for a calibration weight arrangement.

BACKGROUND OF THE ART

Electronic balances are in many cases calibrated by means of an internal calibration weight. To perform a calibration, a calibration weight of a defined mass is brought into force-transmitting contact with a force-transmitting device that is arranged in a force-measuring cell of a balance or with the load-receiving part of the force-measuring cell, whereupon a reference value is determined. Based on this reference value, further weighing parameters of the balance can be updated. After the calibration has been successfully completed, the contact between the calibration weight and the force-transmitting device or the load-receiving part is released again and the calibration weight is secured in a rest position. In the foregoing process, the calibration weight is moved by a transfer mechanism from a rest position to a calibrating position and subsequently returned to the rest position. In the calibrating position, the calibration weight is in force-transmitting contact with the force-measuring cell or with the load-receiving part; in the rest position there is no force-transmitting contact. The calibration weight arrangement and the force-measuring cell in many balances are arranged one behind the other, in the manner disclosed in the applicant's U.S. Pat. No. 6,194,672 B1 to Burkhard, et al.

There are a variety of transfer mechanisms for moving a calibration weight, wherein the latter in its rest position is in most cases seated on a support element that is connected to a lifting system.

A calibration weight arrangement with a calibration weight, as disclosed in the applicant's U.S. Pat. No. 5,148,881 to Leisinger, is moved in the vertical direction by means of pairs of wedges which can be slid horizontally towards each other, whereby the calibration weight is brought into force-transmitting contact with the force-measuring cell of the balance. This transfer mechanism is powered by a motorized drive-mechanism through a spindle that is connected to the wedges.

A device described in the Burkhard '672 patent likewise effects a vertical lifting and lowering of a calibration weight. The weight rests on a support element that is moved by a transfer mechanism with a cam-disk lifting system or an eccentric.

A calibration weight arrangement with two calibration weights that are independent of each other is disclosed in published European patent application EP 0 020 030 A1, wherein the calibration weights are coupled to and uncoupled from a calibration weight support element which is the same for both calibration weights and is connected to the load-receiving part of the force-measuring cell. The stepwise calibration has the purpose to check the calibration weight itself. As a further possibility, at least one of the calibration weights can also serve to expand the weighing range, as disclosed in U.S. Pat. No. 4,566,548 to Soedler, et al.

The aforementioned lifting elements are powered in general by small servomotors. The disadvantage in using servomotors is that a servomotor uses a relatively large amount of space in the force-measuring cell, whereby the size of the force-measuring cell as well as of the balance itself is unnecessarily increased. To improve the calibration weight arrangement, one therefore needs in particular to optimize and miniaturize the drive source of the transfer mechanism.

Especially in electronic balances of high sensitivity, the weighing result is also influenced and even altered by electrostatic charges and interactions. The servomotors used for powering the transfer mechanisms contain electrically non-conductive gearbox parts which during operation generate electrostatic fields due to friction. The electrostatic fields which occur as a result are sufficiently large to have an influence on the weighing result, particularly in balances of high sensitivity.

In Soedler '548, lifter magnets, which are energized by an electric current during the entire calibration and measurement process, are used as a drive source. Lifter magnets thus have the same disadvantage as most of the small and cost-effective drive sources, in that they have no self-locking properties. Drive mechanisms of this type are not suitable for the operation of a calibration weight arrangement for precise analytical balances, because the magnetic fields produced by them as well as the heat generated as a result of the long time periods when the coil is under current have a strong influence on the reference value and on the weighing result. The term "self-locking" in reference to a drive mechanism relates to the ability of the drive mechanism to resist the forces that act on the drive mechanism while the latter is standing still, so that the drive mechanism will not move in response to these forces.

It is therefore the object of the present invention to provide a calibration weight arrangement that is small, compact, and flexibly adaptable to different applications, and has a drive source which exerts no influence or only the smallest possible influence on the reference value to be determined and on the weighing result.

SUMMARY OF THE INVENTION

The solution to meet this objective is provided through the features of claim 1. A gravimetric measuring instrument, in particular a balance, besides having a force-measuring cell with a fixed part and a load-receiving part also includes a calibration weight arrangement, wherein at least one calibration weight can be coupled to the load-receiving part. If the force-measuring cell has a force-transmitting mechanism for the reduction of the force, bringing the calibration weight into engagement with the lever system of the force-transmitting mechanism at any location within the latter is likewise included in the meaning of "coupling a calibration weight to the load-receiving part" as the term is used herein. The calibration weight arrangement has at least one calibration weight, a transfer mechanism including at least one resetting element, a lifting system and at least one positioning element, and a drive source serving to transfer the calibration weight during a movement phase from a rest position into a calibrating position or from the calibrating position to the rest position. The at least one positioning element is configured as a multi-stable positioning element which has a first stable condition defining the calibrating position and a second stable condition defining the rest position of the transfer mechanism. Of course, the multi-stable positioning element can have further stable positions between the calibrating position and the rest position, for example for the purpose of coupling a plurality of calibration weights to the load-receiving part that are independent of each other, as disclosed in EP 0 020 030 A1. The number of positions of the multi-stable positioning element depends on the step sequence of the calibration process. A calibration with a step sequence as proposed for example in EP 0 020 030 A1 requires a tri-stable positioning element in whose third stable position the first of the two calibration weights is engaged and in whose calibrating position the second calibration weight and the first calibration weight together are in contact with the load-receiving part.

In most cases, however, only one calibration weight is used, where a bi-stable positioning element which defines only two positions, i.e., a calibration position and a rest position, is entirely sufficient.

Due to the design concept of the transfer mechanism with a multi-stable positioning element, a small and cost-effective actuator without self-locking feature can be used, where the actuator needs to be supplied with energy only during the movement phases. The holding of the transfer mechanism in the calibrating position, in the rest position and, if applicable, in further stable positions is effected by the combined action of the resetting element and the positioning element, so that the actuator does not have to generate a force that counteracts the resetting element.

Due to the design concept of the multi-stable positioning element and the action of the resetting element, the actuator needs to be energized only when the guide bolt is within certain segments of the guide groove. The energy can be supplied for example in the form of several energy pulses in these segments, or also with only one pulse at the beginning of each movement phase.

Preferably, an electrical actuator is used, and the actuator is supplied with energy in the form of current pulses. When activated, the actuator needs to be capable of overcoming the resetting force of the resetting element.

In *Wissenschaftsmagazin der Ruhr-Universität Bochum RUBIN February* 2001, vol. 11, *Winter Semester* 2001, an article was published with the title "*Keep it simple: Kosmak and iLiros*", in which a compact position-setting drive mechanism is disclosed that is powered by means of a shape memory wire. The drive shaft of the drive mechanism turns back and forth between two angular positions. The two angular positions in this case are likewise defined by a bi-stable positioning element, i.e., a mechanical flip-flop. A shape memory alloy wire of this kind, also referred to as SMA wire, requires only a small amount of space, is not self-locking, and therefore also recommends itself as a drive source for the present invention.

The resetting force of the resetting element needs to be larger than the sum of the weight force of the calibration weight, the forces of the transfer mechanism that act in the direction of the load, and the resistance forces resulting from friction in the transfer mechanism. The resetting force of the resetting element holds the transfer mechanism in place in the calibration position and in the rest position which are defined by the positioning element.

This is accomplished for example with a bi-stable positioning element or mechanical flip-flop which has at least one guide element with a heart-shaped guide groove, similar to a cardioid curve, whose outward-pointed corner corresponds for example to the rest position and whose inward-pointed cusp corresponds to the calibration position. At least one guide bolt that is connected to the fixed part is engaged in this guide groove. The spring force of the resetting element pushes the guide bolt in the respective directions of the point and the cusp of the heart shape. The heart shape is a customary shape for this kind of a guide groove. Of course, it is also possible to use differently shaped guide grooves which allow at least two stable positions of the positioning element. The design of the individual curve segments is adapted substantially to the configurations of the corresponding transfer mechanisms and their sequence of movements. Instead of a guide groove, one could also use form elements whose outside or inside contours function in an analogous way as the guide groove. The same also applies to the guide bolt, whose design is adapted to the other parts of the positioning element.

In principle, a multitude of multi-stable elements can be used for the positioning, such as for example mechanical flip-flops which work by means of springs or by means of permanent magnets, as well as pneumatic and hydraulic solutions.

In order to ensure that the guide bolt in the guide groove of a multi-stable positioning element continues in the right sense of direction as it proceeds around the groove and does not run back again through the same curve segment, preventive means have to be provided against backward movement. Such means can be realized in the form of resilient tongs in the guide groove, whereby curve segments are blocked off, similar to the function of a railroad track switch. A simpler solution is to use a resilient connection such as a bending spring realized through a thin flexible connecting portion, or a flexure pivot, that is arranged between the lifting system and the multi-stable positioning element, wherein the thin bending-spring connection or the flexure pivot is in a neutral state in regard to bending stresses when the guide bolt is between the calibrating position and the rest position. In the stable positions, the guide bolt is thus spring-biased in a given direction in relation to the guide element and consequently, due to the geometry of the guide groove and in accordance with the force vector resulting from the respective force vectors of the resetting element and the thin bending-spring connection, the guide bolt can continue its movement only in one direction. As a general observation, the guide bolt can, of course, also be connected to the lifting system and the guide element can be connected to the fixed part.

However, the multi-stable positioning element can also include a mechanism of the kind used for example in ball-point pens, as described, for example, in U.S. Pat. No. 3,101,075 to Johmann. The positioning element has in this case a guide element in the shape of a rotatably supported cylinder or sleeve that is connected to the fixed part of the force-measuring cell, wherein the circumference of the cylinder contains at least one guide groove with the two positions that represent the calibrating position and the rest position, in which at least one guide bolt is engaged that is connected to the lifting system. Of course, the guide element in the shape of a rotatably supported cylinder or sleeve, too, can be connected to the lifting system, and the guide bolt can be connected to the fixed part.

The lifting system includes preferably at least one knee-joint linkage. The resetting element and the lifting system are matched to each other in such a way that the knee-joint linkage buckles already when a small tensile force is acting on the lifting system, whereby the calibration weight is brought into force-transmitting contact with the force-measuring cell. The force of the resetting element, in turn, is designed so that it straightens the knee-joint linkage as the force acting on the lever system subsides.

Depending on the design of the transfer mechanism and in particular of the lifting system, different kinds of resetting elements can be used. This includes, among others, various kinds of springs or other components that have a comparable effect. With preference, the resetting elements are slightly tension-biased in the rest position of the calibration weight arrangement. Different kinds of springs can be used such as for example arm springs, compressive coil springs, tensile coil springs, torsion-bar springs, or leaf springs. The particular advantage of using an arm spring is that the resetting force of the spring acts directly on the knee joint, and the spring itself, due to the way in which it is connected, does not vibrate or cannot otherwise change its position.

Preferably, two knee-joint linkages are used in a parallel arrangement, wherein the knee joints are connected through their axles so that both knee-joint linkages move simultaneously and cannot hinder or even jam-lock each other. One or more knee-joint linkages, in turn, can include a plurality of formed parts which are connected to each other directly or indirectly through appropriate connecting means or which can also be formed integrally of one piece. The lifting system, the resetting element and at least parts of the positioning element can likewise be monolithically connected to each other. With an appropriate configuration, the lifting system can also have only one single knee-joint linkage.

The resetting force of the resetting element is matched to the transfer mechanism in which it is used, in order to ensure that the calibration process, i.e. the engagement and disengagement of the contact between the calibration weight and the force transmitting device or load-receiving part, runs in an optimal manner.

As a non-self-locking actuator for a calibration weight arrangement with a lifting system configured as a knee-joint linkage, a variety of drive sources and in particular linear drives recommend themselves, such as for example spindle drives, belt drives, magnetic drives, as well as linear motors. Of particularly small and compact dimensions are drive mechanisms which are formed at least in part of a shape memory alloy. Even a manual actuation of the transfer mechanism is conceivable, wherein transfer means would, of course, have to be provided in order to transfer the manually applied energy pulse to the transfer mechanism. The actuator can activate the transfer mechanism for example also by redirecting the force by way of at least one pulley or lever.

However, using a multi-stable positioning element presents the problem that every time the gravimetric instrument is put into operation, the actual position of the calibration weight arrangement is unknown. It is entirely possible for this position to change as a result of extraneous factors such as for example shocks, even during a time when the gravimetric measuring instrument is switched off. This can only be prevented if the mechanism is equipped with expensive locking measures. It is simpler and more cost-effective if the actual state of the calibration weight arrangement is checked every time the gravimetric measuring instrument is put into operation or also at periodic intervals, and the calibration weight arrangement is moved into a defined condition, for example into the rest position. To check and define the state of the calibration weight arrangement with a multi-stable positioning element, one can use for example the following method.

First, a reference signal value of the force-measuring cell is determined, and this reference signal value is stored together with its assigned position number one. Subsequently, the multi-stable positioning element is cycled through every further stable position until the cycle has returned to the position of the reference signal value, wherein during this cycle a weighing signal value of the force-measuring cell is determined in each stable position and stored in the running sequence of position numbers. The weighing signal values and the reference signal value are now compared to each other, whereby the lowest signal value is determined as well as the difference between the position associated with the latter and the position associated with the reference value. Starting from the position of the reference value and in accordance with the position difference that was determined, the actuator is now supplied with the required number of energy pulses until the position with the lowest signal value has been reached which represents the rest position.

If a bi-stable positioning element is used in the calibration arrangement, the process is simplified as follows:

Again, the first step is to determine and store a reference signal value of the force-measuring cell. Next, an energy pulse is sent to the actuator, and a weighing signal value of the force-measuring cell is determined; the reference value is compared to the weighing signal value, and a further energy pulse is sent to the actuator, if the weighing signal value is larger than the reference signal value.

If a reference value is already stored at the factory, for example the weighing signal value associated with a state where the calibration weight arrangement is in its rest position and there is no load on the load receiver, the determination of a reference value is of course unnecessary, and the actuator is fed with energy pulses until the weighing signal value of the force-measuring cell matches the reference value, but at the most as many pulses as there are stable positions.

BRIEF DESCRIPTION OF THE DRAWINGS

Different embodiments of the calibration weight arrangement are illustrated in the drawing figures, wherein identical parts are identified with identical reference numbers and wherein:

FIG. 2 is a schematic, simplified side view of a calibration weight arrangement with a knee-joint linkage, an actuator configured as a wire of a shape memory alloy, and a multi-stable positioning element, wherein

DETAILED DESCRIPTION OF A PREFERRED EMBODIMENT

Figure 1A:
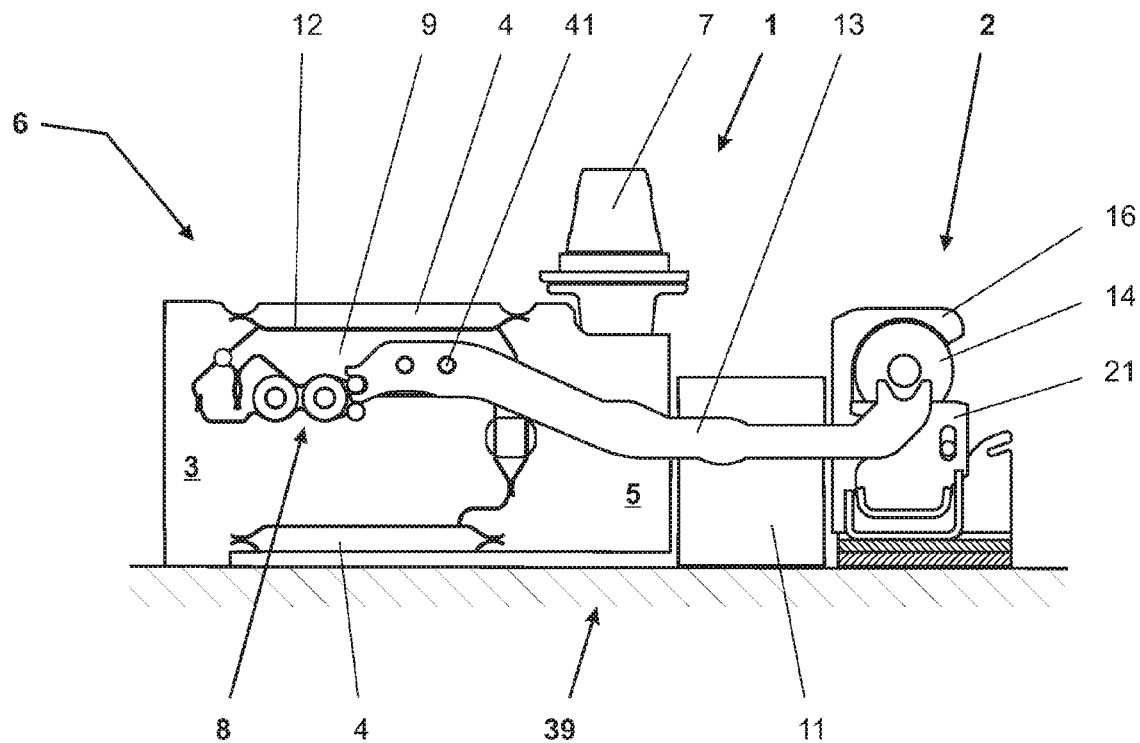
FIG. 1 is a schematic, simplified side view of a force-measuring cell of an electronic balance with an elongated calibration weight arm and a calibration weight arrangement including a calibration weight arranged next to the force-measuring cell, with FIG. 1a showing the calibration weight in its rest position and FIG. 1b showing the calibration weight in its calibrating position.
Figure 1B:
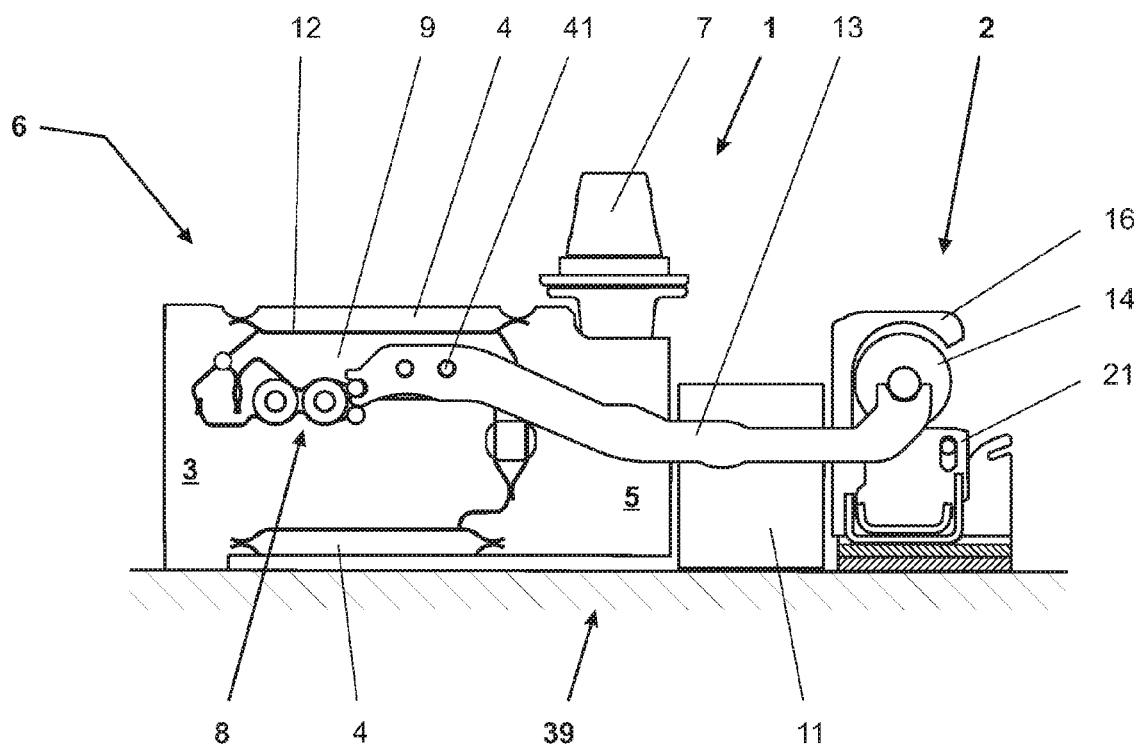

In order to visualize the conventional arrangement of a force-measuring cell 6 and a calibration weight arrangement 2 in a gravimetric measuring instrument 1, specifically in an electronic balance, the force-measuring cell 6 and calibration weight arrangement 2 are illustrated in a side view in FIG. 1. FIG. 1a shows a calibration weight arrangement 2 in its rest position, and FIG. 1b shows a calibration weight arrangement 2 in its calibrating position. The force-measuring cell 6 has a parallel-guiding mechanism with a fixed part 3 and a load-receiving part 5 that is movably constrained relative to the fixed part 3 by two parallelogram guides 4. The fixed part 3 and the calibration weight arrangement 2 are mounted on a base 39, for example the housing floor of the gravimetric measuring instrument 1. The load-receiving part 5 is connected by way of the cone 7 to a weighing pan (not shown in the drawing) and has the ability to move vertically relative to the fixed part 3 in the direction of the gravitational force when a load is placed on the weighing pan. A displacement of the load-receiving part 5 in the direction of the gravitational force causes a force to be transmitted to a lever mechanism 8 which reduces the force and passes it on to a force-compensation system 11, normally of the electromagnetic type, which is not shown in detail in this drawing.

The parallel-guiding mechanism 3, 4, 5 and the lever mechanism 8 of the force-measuring cell 6 are formed in the substantially brick-shaped material block in such a way that the material portions of the latter are separated by material-free spaces in the form of narrow linear cuts 12 which cut through the material block in the direction perpendicular to its largest surface. The linear cuts 12 are produced preferably by means of spark erosion.

The lever 9 of the lever mechanism 8 is provided with passage holes where a calibration weight arm 13 is attached as a lever extension by means of appropriate fastening means 41 in such a way that a capacity-load calibration can also be performed with a calibration weight 14 of a small mass.

As can be seen in FIG. 1a, during a weighing process a calibration weight 14 rests on a calibration weight support element 21 and is pushed against the lateral parts of the calibration weight arrangement 2 which are configured as holding brackets 16. In this drawing, the lateral part that faces the viewer has been removed from the calibration weight arrangement 2, so that the calibration weight support element 21 and in particular the area of contact between the calibration weight 14 and the calibration weight arm 13 can be seen. The same applies also to FIG. 1b.

In FIG. 1a, the calibration weight 14 is shown completely uncoupled from the lever mechanism of the force-measuring cell 6. To perform a calibration, the calibration weight 14 is lowered onto the calibration weight arm 13 by means of a transfer mechanism (which in this representation is covered up by the calibration weight support element 21), whereby the calibration weight 14 is brought into force-transmitting contact with the lever mechanism 8, as is shown in FIG. 1b. Thus, when the calibration weight 14 is in the calibrating position, it rests completely on the calibration weight arm 13. The transfer mechanism includes a lifting system and a drive source. The drive source is generally arranged next to the calibration weight arrangement 2, in front of and behind the plane of the drawing in the representation of FIG. 1.

Figure 2A:
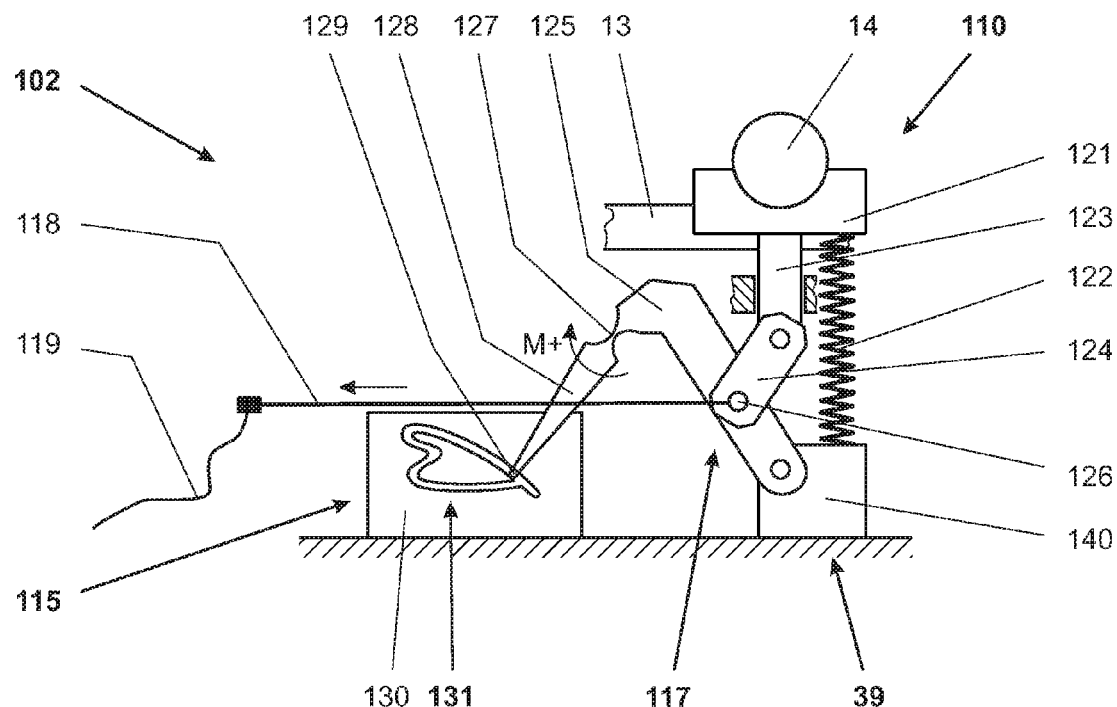
FIG. 2a shows the calibration weight arrangement in the rest position.
Figure 2B:
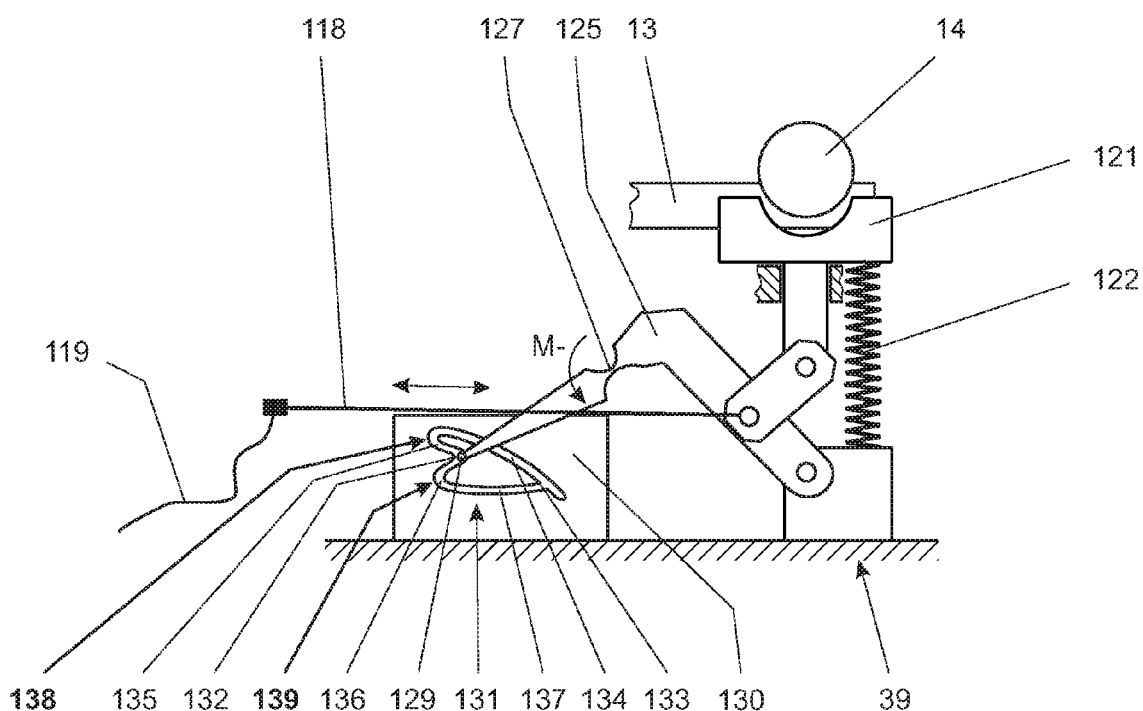
FIG. 2b shows the calibration weight arrangement in the calibrating position.

The schematic, simplified side view of a calibration weight arrangement 102 is shown in FIG. 2, wherein FIG. 2a shows the calibration weight arrangement 102 in its rest position and FIG. 2b shows the calibration weight arrangement 102 in the calibrating position. The calibration weight arrangement 102 is connected to the fixed part of the weighing cell (which is not shown here) through the base 39 and contains the calibration weight 14, a lifting system 110, an actuator 118, 119 and a multi-stable positioning element 115.

The lifting system 110 includes a guide rod 123 that is constrained to a linear movement perpendicular to the base 39, and also includes a pivoted arm 125 which is rotatably connected at one end to a fulcrum block 140 that is mounted on the base 39, and further includes a connecting member 124 whose first end is pivotally connected to the end of the guide rod 123 that is nearer to the base 39 and whose second end bears against the middle of the pivoted arm 125 by means of a pivot joint 126. At the knee-joint linkage 117 that is formed of the pivoted arm 125, the pivot joint 126 and the connecting member 124, a force is applied in the area of the pivot joint 126 by a non-self-locking actuator 118, 119 in the form of a wire consisting of a shape memory alloy, which can be heated and functions as a part of the drive mechanism. Shape memory alloys have the distinguishing trait that, on passing through a phase transition temperature, they change their physical properties due to a solid phase transition. Shape memory alloys are more easily formable at temperatures below their phase transition temperature than they are at temperatures above the phase transition temperature. When the shape memory alloy has the form of a wire, a temperature increase above the phase transition temperature has the effect that the wire contracts itself and is thereby enabled to exert a force which acts for example as a pulling force on the knee-joint linkage 117 shown here, causing the latter to move. The temperature increase can occur in a simple way by energizing the wire 118 with an electric current, as indicated here by the electrical connecting lead 119 at one end of the wire. The wire 118 is grounded at the opposite end which is not shown here.

As soon as the wire contracts itself, the pivot joint 126 moves out of place whereby the knee-joint linkage 117 is caused to fold, so that as a result a linear movement of the guide rod 123 in the direction perpendicular to the base 39 takes place. Since the end of the guide rod 123 that is farther from the base 39 carries the calibration weight support element 121, the latter undergoes a displacement in the direction towards the base 39. The calibration weight 14 which lies on the calibration weight support element 121 is thus set down on the calibration weight arm 13 and completely uncoupled from the transfer mechanism after, e.g., one-half of the lifting interval of the lifting system 110. In order to reverse this movement and thereby lift the calibration weight 14 up again from the calibration weight arm 13, a resetting element 122 in the form of a compressive coil spring has to be arranged between the base 39 and the calibration weight support element 121. As soon as the pulling force of the actuator 118 subsides, the knee-joint linkage 117 straightens again as a result of the resetting force of the resetting element 122, and the calibration weight 14 is lifted off and uncoupled from the calibration weight arm 13 by the lifting system 110. If the actuator 118 includes an SMA wire, the resetting element 122 has the additional effect that as the wire cools down after the calibration, it is stretched back to its original length, which requires a force.

In order to avoid having to continually supply the actuator 118 with energy during the calibration process in order to hold the transfer mechanism in the calibrating position, a guide element 130 which is part of a multi-stable positioning element 115 is mounted in a fixed position on the base 39. The guide element 130 has a guide groove 131 which is substantially heart-shaped. The illustrated multi-stable positioning element 115 can thus also be referred to as a bi-stable positioning element 115. The movable part of the positioning element 115, composed of a guide bolt 129 and a guided coupling member 128, is connected through a thin bending-spring connection 127 to the end of the pivoted arm 125 that faces away from the fulcrum block 140. The position shown in FIG. 2a represents the rest position. The thin bending-spring connection 127 is stress-biased and exerts a clockwise moment M+ on the guided coupling member 128, whereby the guide bolt 129 is pushed against the flank of the guide groove 131 that is farther from the base 39. The shape and position of the guide groove 131 are matched to the movement sequence of the pivoted arm 125 in such a way that the force vector resulting from the spring elements 127, 122 will cause the guide bolt 129 to always proceed counterclockwise through the guide groove 131.

The following description of the sequence of movements will provide a more detailed explanation. In the interest of greater clarity, the segments of the guide groove 131 are identified only in FIG. 2b. The guide groove 131 has an outward-pointing corner 133 of the heart shape, which defines the rest position, and an inward-pointing cusp 132 which defines the calibrating position of the transfer mechanism. The groove segment of the guide groove 131 that is farther from the base 39 will be referred to as the first segment 134, the segment between the first segment 134 and the cusp 132 will be referred to as the second segment 135, the groove segment closest to the base 39 will be referred to as the fourth segment 137, and the segment between the fourth segment 137 and the cusp 132 will be referred to as the third segment 136.

As soon as the knee-joint linkage 117 folds due to the force of the actuator 118, the guide bolt 129, starting from the rest position shown in FIG. 2a, glides through the first segment 134, because the clockwise moment M+ generated by the thin bending-spring connection 127, more specifically the force vector which as a result acts on the guide bolt 129, pushes the latter against the flank of the first segment 134 that is farther from the base 39. In this segment 134, between the outward-pointing corner 133 and the inward-pointing cusp 132 of the heart shape, the guide bolt 129 arrives at a point where the thin bending-spring connection 127 reaches a neutral state in regard to bending stresses. The farther the guide bolt 129 is moved in the direction towards the second segment 135 and towards the cusp 132, the stronger the thin bending-spring connection 127 is stressed again, but now in the direction that causes the thin bending-spring connection to exert a counterclockwise moment M−. As soon as the second segment 135 has been reached the guide bolt, due to the force vector produced by the thin bending-spring connection 127, proceeds through the second segment 135 in the direction towards the base 39. The energy supply to the actuator 118 is cut off when a first turn-around point 138 has been reached which lies approximately in the middle of the second segment 135, and due to the spring force of the resetting element 122, the guide bolt 129 glides into the cusp 132. The pivoted arm 125 is thereby held in a position as shown in FIG. 2b, which represents the calibrating position. When the guide bolt 129 is in the cusp 132 of the heart shape, the thin bending-spring connection 127 still exerts a moment M−, so that the guide bolt 129 is pushed in the direction of the third segment 136 and proceeds to glide through the latter as soon as the actuator 118 is energized again. The energy supply is cut off as soon as the guide bolt has reached the second turn-around point 139.

The resetting element 122 now pulls the guide bolt 129 through the second half of the third segment 136 and through the fourth segment 137 towards the outward-pointing corner 133 of the heart shape. Due to the geometry of the arrangement, the thin bending-spring connection 127 again undergoes a reversal of the bending moment in the segment 137, so that on arrival at the corner 133 of the heart shape, the force vector acting on the guide bolt 129 is again directed away from the base 39. The pivoted arm 125 and the calibration weight 14 are back to the starting position of FIG. 2a which represents the rest position.

Figure 3:
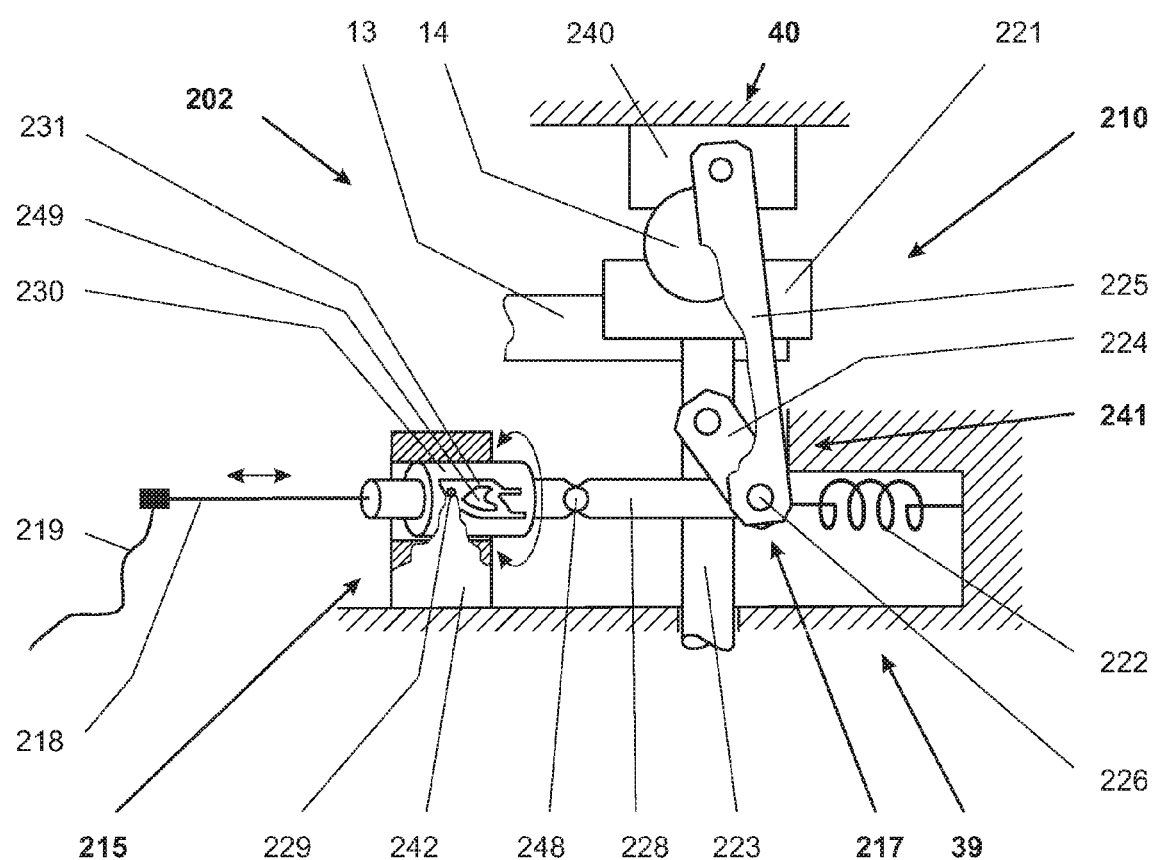
FIG. 3 is a schematic, simplified side view of a calibration weight arrangement with a knee-joint linkage, an actuator configured as a wire of a shape memory alloy, and a multi-stable positioning element in the form of a rotatably supported cylinder, wherein the knee-joint linkage has an acute angle between the knee-joint members in order to achieve a lower overall height.

The embodiment of a calibration weight coupling mechanism 202 in FIG. 3 includes a lifting system 210 which has substantially the same functional elements as the lifting system 110 of FIG. 2. In order to achieve a lower overall height, the fulcrum block 240 is however mounted above the calibration weight on a support 40 which is rigidly connected to the base 39 and serves at the same time as holding bracket for securing the calibration weight 14. As a result, the knee-joint linkage 217 has an acute angle between the connecting element 224 and the pivoted arm 225. The guide rod 223 is constrained to a linear movement relative to the base 39, and the calibration weight support element 221 that is connected to the guide rod 223 is configured analogously to the calibration weight support element 121 of FIG. 2, in order to transfer the calibration weight 14 to the calibration weight arm 13 and take the calibration weight back again from the calibration weight arm 13 when the lifting system is actuated.

The resetting element 222 in the form of a tensile spring is acting directly on the pivot joint 226 and thus against the pulling force of the actuator 218. In addition, when the resetting element 222 is in the rest position it pulls the knee joint 217 against a stop 241 that is solidly connected to the base 39. In this position, the connecting member 224 is arranged in such a way in relation to the pivoted arm 225 that overloads which—due to the position of the knee-joint linkage 217—act on the lifting system 210 and which are caused for example by shocks from the outside, are absorbed by the stop 241 directly through the knee-joint linkage 217. Thus, the actuator 218 is not destroyed by overloads.

A multi-stable positioning element 215, again in a bi-stable configuration, is arranged between the actuator 218 and the pivot joint 226, acting in series with the actuator 218. In order to show its function more clearly, this part is shown in a perspective representation. The serial arrangement is not an absolute requirement; it is also possible to use an arrangement parallel to the actuator 218.

The guide element 230 in the shape of a cylinder that is rotatably connected to a coupling member 228 has a guide groove 231 surrounding a heart-shaped raised central contour 249 wherein the heart-shaped area of the central contour 249 is at the level of the outside wall of the cylinder. The guide element 230 is supported so that it can only rotate but is not displaceable in the axial direction relative to the coupling member 228. Ideally, the entire multi-stable positioning element 215 is guided for linear movement, as indicated schematically in FIG. 3 by the bearing 242 in which the guide bolt 229 is also directly integrated. However, with this kind of guide arrangement, the coupling member 228 needs to have a rotary joint 248 or at least be designed to have elasticity. The guide groove 231 is designed so that with the linear movement of the guide element 230 relative to the stationary guide bolt 229, the guide element 230 is in each case turned into the appropriate position by means of the flank segments 243, 244, 245, 246, 247 of the guide groove 231, so that the guide bolt 229 always proceeds clockwise through the guide groove shown in FIG. 3. With this arrangement, it is important that the guide element 230 has a certain amount of bearing friction relative to the connecting member 228 or the bearing 242, so that the guide element 230 will stay at the angle of rotation defined by a flank of the guide groove 231 until the next flank causes the guide element 230 to continue its rotation. As a result, vibrations or shocks cannot lead to malfunctions. The guide element 230 shown in FIG. 3 is designed for reciprocating rotary movements. However, one could also use revolving guide elements with a given sense of rotation of the type used in the writing-instrument industry, for example in ball-point pens. This embodiment with reciprocating or revolving guide elements is particularly well suited for applications which require additional stable positions between the calibrating position and the rest position.

Figure 4A:
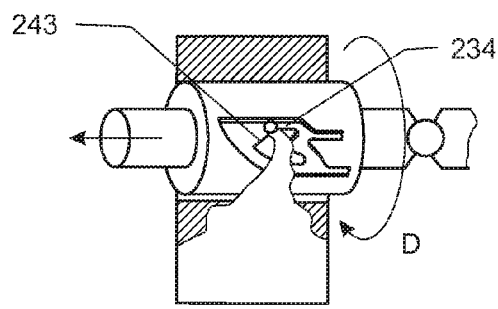
FIG. 4 illustrates the multi-stable positioning element in the form of a rotatably supported cylinder of FIG. 3, wherein the FIGS. 4a to 4f represent different positions of the positioning element.
Figure 4B:
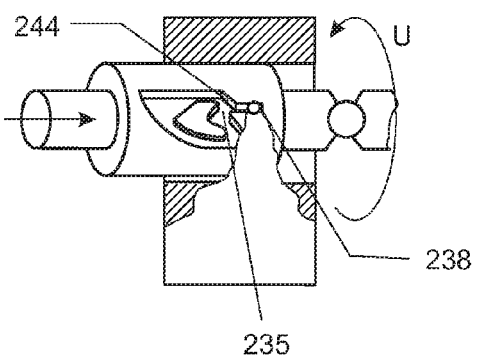
Figure 4C:
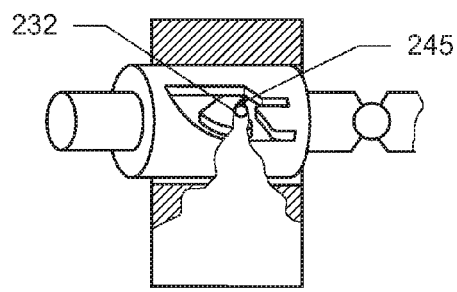
Figure 4D:
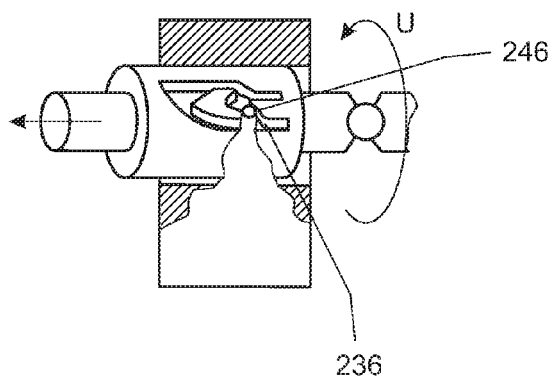
Figure 4E:
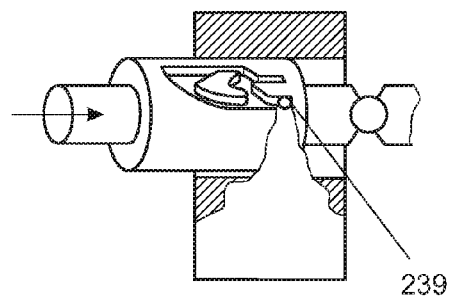
Figure 4F:
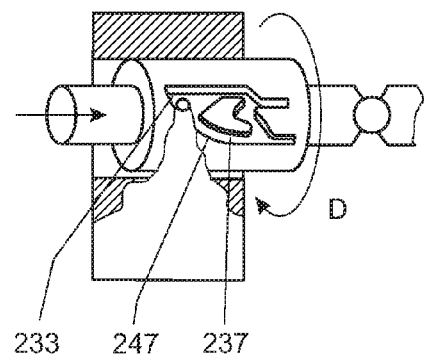

To illustrate the function and the sequence of movements of the reciprocating guide element 230 more clearly, the principal positions are shown in FIGS. 4a to 4f. Starting from the rest position 233 shown in FIG. 3, as the actuator is energized it begins to pull the guide element 230 through the bearing 242. In the first segment 234, the guide bolt 229 being in contact with the first flank 243 causes the guide element 230 to turn in the direction D, as is shown in FIG. 4a. As soon as the guide bolt 229 reaches the second segment 235 and thus the second flank 244, the guide element 230 turns in the direction U until the guide bolt 299 has arrived at the first turn-around point 238 (see FIG. 4b). At this point, the energy supply to the actuator 218 is cut off and the resetting force of the resetting element 222 pulls the guide element 230 in the opposite direction through the bearing 242 until the guide bolt 229 has arrived at the calibrating position 232 (see FIG. 4c). In this phase, the guide element 230 is caused by the third flank 245 to continue the rotation in the direction U. In order to move the guide bolt 229 through the third segment 236, the actuator 218 needs to be energized again until the guide bolt 229 reaches the second turn-around point 239. In this step, the guide element is moved once more in the direction U by the fourth flank 246 and is pulled by the actuator 218 through the bearing 242, as shown in FIG. 4d. When the guide bolt 229 has arrived at the second turn-around point 239 as shown in FIG. 4e, the energy supply to the actuator 218 is cut off again, the direction of movement is reversed, and the resetting element 222 pulls the guide element 230 back in the direction towards the rest position 233 through the fourth segment 237. In the fourth segment 237, through the interaction of the guide bolt 229 with the fifth flank 247, the guide piece 230 is turned again in the direction D into the starting position, as shown in FIG. 4f.

Of course, the guide element 230 could also have a guide groove 131 of the kind shown in FIG. 2. However, in order to ensure that the guide bolt 229 moves in the right direction around the guide groove 131, the guide element 230 would in this case have to be biased by means of a spring force, for example by a torsion bar spring, in the correct direction associated with each phase of the movement.

In addition to the calibration weight arrangements presented so far, there is also the possibility to form the knee-joint linkage as well as further functional parts of the lifting system such as the movable part of the positioning element monolithically out of one piece and to combine them for example with a transfer mechanism similar to the one shown in FIGS. 2 and 3. A lifting system 310 of this kind in a calibration weight arrangement 302 with a monolithically formed knee-joint linkage 317 is illustrated in FIG. 5.

Figure 5:
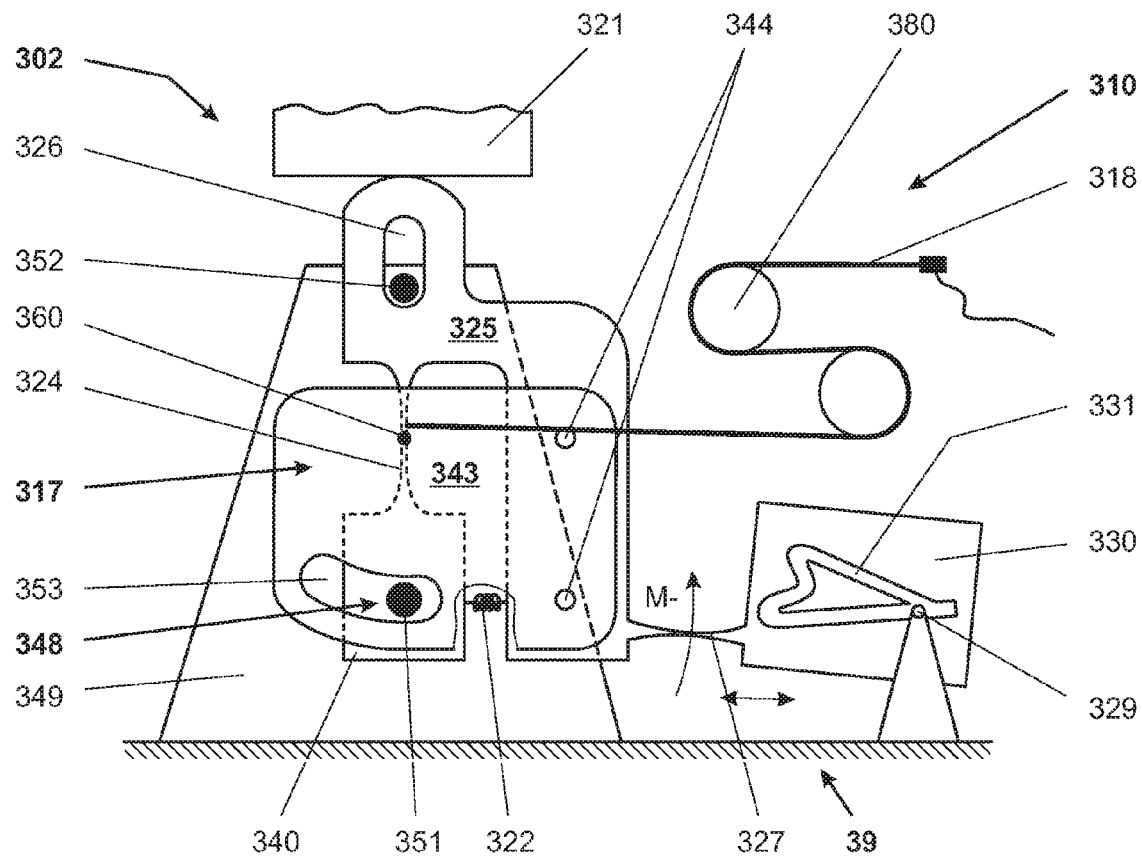
FIG. 5 is a side view of a monolithically formed transfer mechanism, shown here in its rest position, with an integrally incorporated overload protection feature and a bi-stable positioning element.

FIG. 5 shows the knee-joint linkage 317 in a stretched-out state, i.e., the knee-joint linkage 317 is aligned vertically and is in a position close to the rest position, without being pushed against a stop. The contours shown in broken lines represent elements that lie behind the drawing plane and would normally be covered from view.

The lifting system 310 is made monolithically of one piece, preferably of a technical polymer material. It consists of three functional areas that are connected to each other. The first functional area 325 has two attachment points 344 that serve to fasten a displacement-stop element 343, and it further contains an elongated hole 326. The displacement-stop element 343 and the knee-joint linkage 317 are fixedly connected to each other and can also be realized as one single component. The second functional area 340 is connected to the first functional area 325 once through a flexure pivot 324 and secondly through a tensile spring that serves as resetting element 322. The second functional area 340 further includes a fulcrum point 348 whose fulcrum axle 351 pivotally supports the second functional area 340 in the largest plane of the lifting system 310 through a bearing plate 349 against a base 39. Likewise rigidly connected to the bearing plate 349 in parallel with the fulcrum axle 351 is a guide pin 352. This guide pin 352 is engaged in an elongated hole 326 and thereby limits the range of movement of the first functional area 325. The translatory movement is delimited by the length of the elongated hole 326, while the rotary movement about the flexure pivot 324 is delimited by the fulcrum point 348 of the second functional area 340. The third functional area 330 is likewise monolithically connected to the first functional area 325 through a thin bending-spring connection 327. The third functional area 330 includes the guide groove 331 which is already known from FIG. 2. However, unlike the arrangement illustrated in FIG. 2, the guide groove 331 in FIG. 5 moves relative to a guide bolt 329 that is rigidly connected to the base 39. In the rest position illustrated here, the thin bending-spring connection 327 exerts a moment M− on the third functional area 330, so that the guide groove 331 is pushed away from the base 39 against the guide bolt 329. Thus, the guide bolt 329 follows the guide groove 331 in the clockwise direction.

As illustrated in FIG. 5, the point of application 360 of the force generated by the actuator 318 is located at the center of the flexure pivot 324. However, this does not mean that the actuator 318 will necessarily have to be connected to the flexure pivot 324; it can also be fastened to the displacement-stop element 343 or even to the second functional area 340. The closer the point of force application 360 is to the fulcrum axle 351 or to the guide pin 352, the shorter the displacement travel that the actuator 318 has to produce, but the larger the force, in accordance with the law of lever-action.

The displacement-stop element 343 has an arcuate elongated hole 353 cooperating with the fulcrum axle 351. This feature serves to protect the flexure pivot 324 against overloads, because on the one hand the bending angle of the flexure pivot 324 is delimited by the length of the arcuate elongated hole 353, and on the other hand peak forces caused by shocks that are directed perpendicular to the base 39 are transferred directly through the flanks of the arcuate elongated hole 353 to the fulcrum axle 351.

In the calibration process of the gravimetric measuring instrument, the actuator 318 exerts on the displacement-stop element 343 a pull that is directed to the right relative to the situation shown in the drawing. This has the effect that the second functional area 340 is displaced so that the latter turns slightly about the fulcrum axle 351 and folds the knee-joint linkage 317. The actuator 318 further has the effect that the resetting element 322 is put under tension and the flexure pivot 324 is bent. As a result, the displacement-stop element 343 and the first functional area 325 of the knee-joint linkage 317 swivel to the right and are in addition pulled towards the base 39. The calibration weight support element 321 is moved downward and the calibration weight is brought into force-transmitting contact with the force-measuring cell.

A shape memory alloy contracts itself in length by a certain percentage. For example, a nickel titanium alloy with a nickel content of about 50% contracts itself by about 4% at a phase-transition temperature of about 90° C. However, the wire 318 is flexible and can be arranged with several changes in direction, for example as shown here by way of two pulleys 380 of an electrically and thermally nonconductive, smooth-gliding technical polymer such as Teflon. The wire can also be arranged with several changes in direction by way of one or more direction-changing means such as levers and/or pulleys.

Figure 6:
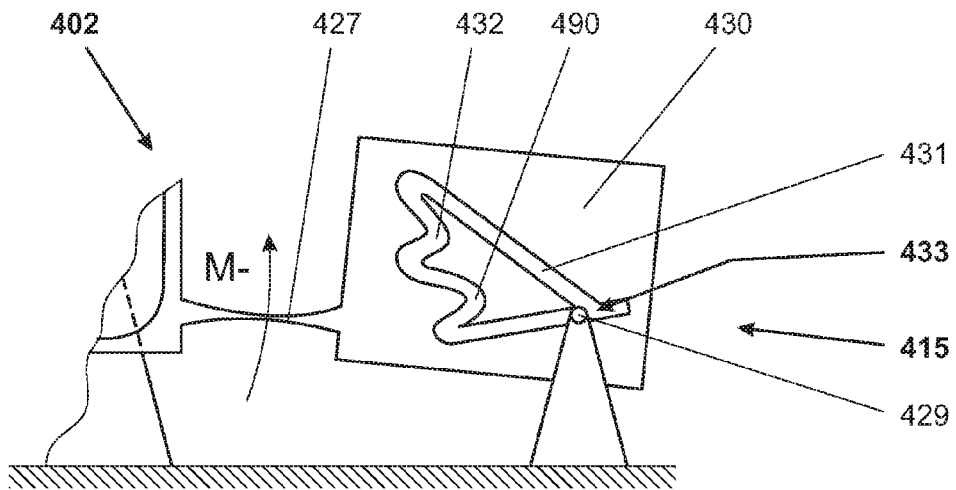
FIG. 6 is an enlarged side view of a monolithically formed transfer mechanism analogous to FIG. 5, shown in its rest position, with an integrally incorporated overload protection feature, wherein the illustrated detail shows a tri-stable positioning element instead of the bi-stable positioning element.

FIG. 6 represents only the third functional area 430 of a calibration weight arrangement 402 that is otherwise identical to the arrangement of FIG. 5. Instead of the guide groove 331 of FIG. 5 which has a bi-stable positioning function as was the case in all of the preceding drawing figures, the guide groove 431 of the multi-stable positioning element 415 has tri-stable positioning function. Between the rest position 433 and the calibrating position 432 there is a first stable intermediate position 490. In multi-stable positioning elements with even more intermediate positions, the latter are arranged between the rest position 433 and the calibrating position 432, analogous to the illustrated tri-stable guide groove 431. The operating sequence of a tri-stable positioning element or of multi-stable positioning elements with even more intermediate positions is not substantially different from the operating sequence of bi-stable solutions. The actuator only has to be supplied with an additional energy pulse for each intermediate position in order to reach the starting position again. The reversal of the bending moment in the thin bending-spring connection 427 has to occur only at the points where the guide bolt 429 is located between the rest position 433 and the calibrating position 432 or between the rest position 433 and the first stable intermediate position 490.

Besides the aforementioned actuator without a self-locking feature, which includes a shape memory alloy, one can in principle use any commercially available drive source without self-locking, and preferably any linear drive source, if the latter meets the requirements for the drive source of a calibration weight arrangement of a gravimetric measuring instrument, in particular an electronic balance. The known types of linear drive sources include, among others, spindle drives, belt drives, magnetic drives, or linear motors. Even manually actuated solutions can be used.

For resetting elements, the solutions described in the foregoing embodiments include primarily springs such as compressive coil springs, tension springs and leaf springs. In addition to these explicitly described types of springs, one can of course also use other kinds of springs or components that have a comparable effect. Depending on the resetting force to be produced, it is possible to use one or a plurality of resetting elements.

The aforementioned force-measuring cell represents only one of the known kinds of force-measuring cells. The calibration weight arrangement according to the invention can also be used in other force-measuring cells.

In FIGS. 2, 3 and 5, the point of force-application of the actuator is shown to be at the knee joint, but other force-application points can likewise be realized.

The displacement-stop element 241 shown in FIG. 3 is configured as a kind of housing wall, which is only meant as an example. The possibilities also include any other designs that have the same effect or perform the same function, and such designs can of course also be used in a suitable manner in a configuration according to FIG. 3.

What is claimed is:

1. A calibration weight arrangement for a gravimetric measuring instrument having a force-measuring cell comprising a fixed part and a load-receiving part, the calibration weight arrangement comprising:
   at least one calibration weight, adapted to be coupled to the load-receiving part;
   a transfer mechanism for transferring the at least one calibration weight during a phase of movement from a rest position into a calibrating position and from the calibrating position to the rest position, the transfer mechanism comprising:
      at least one resetting element, selected from the group consisting of: an arm spring, a torsion-bar spring, a leaf spring, a compressive coil spring and a tensile coil spring;
      a lifting system; and
      a drive source that comprises a non-self-locking actuator that is energized only during the movement phase, and
   a bi-stable or tri-stable positioning element, with a first stable state thereof defining the calibrating position, a second stable state thereof defining the rest position, and with the third stable state, if present, located between the calibrating and rest positions.

2. The arrangement of claim 1, wherein:
   the resetting element has a resetting force that is greater than the maximum weight force of the at least one calibration weight and of the forces of the transfer mechanism acting in the direction of the load as well as of the resistance forces resulting from friction in the transfer mechanism, and
   wherein the resetting force of the resetting element holds the transfer mechanism in a position defined by a stable state of the bi-stable or tri-stable positioning element.

3. The arrangement of claim 2, wherein:
   the actuator is supplied with energy in the form of at least one energy pulse.

4. The arrangement of claim 3, wherein:
   the actuator is supplied with a single energy pulse of sufficient strength to transfer the at least one calibration weight from the rest position into the calibrating position, or vice versa, at the beginning of each movement phase.

5. The arrangement of claim 4, wherein:
   the lifting system comprises at least one knee-joint linkage.

6. The arrangement of claim 1, wherein:
   the bi-stable or tri-stable positioning element comprises a guide bolt and a guide element having a guide groove, the guide groove comprising first and second segments, the calibrating position, third and fourth segments and the rest position,
   wherein the actuator is energized only when the guide bolt moves through the first and second segments to a first turn-around point, and when the guide bolt moves through the third segment starting from the calibrating position and proceeding to a second turn-around point.

7. A method of checking and defining the state of a calibration weight arrangement, the method comprising the steps of:
   a. providing a calibration weight arrangement having a bi-stable or tri stable positioning element as defined in claim 1;

b. determining a reference signal value of the force-measuring cell and storing the reference signal value in memory;
c. supplying an energy pulse to the actuator;
d. determining a weighing signal value of the force-measuring cell;
e. comparing the reference value to the weighing signal value; and
f. supplying a further energy pulse to the actuator if the weighing signal value is larger than the reference signal value.

8. The arrangement of claim 1, wherein:
the bi-stable or tri-stable positioning element comprises a guide bolt connected to the fixed part and at least one guide element having a heart-shaped guide groove, wherein the outward-pointing corner of the heart shape corresponds to the rest position and the inward-pointing cusp of the heart shape corresponds to the calibrating position,
wherein the guide bolt engages the guide groove.

9. The arrangement of claim 8, further comprising:
a thin bending-spring connection, arranged between the lifting system and the bi-stable or tri-stable positioning element, the thin bending-spring connection being in a neutral condition with regard to bending stresses when the guide bolt is between the calibrating position and the rest position.

10. The arrangement of claim 1, wherein:
the bi-stable or tri-stable positioning element comprises a guide bolt connected to the fixed part, at least one guide element in the form of a rotatably supported cylinder or sleeve that is connected to the lifting system, the cylinder wall of the guide element comprising at least one guide groove with at least the two positions that respectively represent the calibrating position and the rest position,
wherein the guide bolt engages the guide groove.

11. The arrangement of claim 1, wherein:
the resetting element, the lifting system and the bi-stable or tri-stable positioning element comprise at least three formed components which are connected to each other directly or through suitable connecting means.

12. The arrangement of claim 1, wherein:
the resetting element, the lifting system, and at least part of the bi-stable or tri-stable positioning element are formed as a monolithic piece.

13. The arrangement of claim 1, wherein:
the non-self-locking actuator is a linear driving mechanism.

14. The arrangement of claim 13, wherein:
the non-self-locking actuator acts on the transfer mechanism through at least one of: a pulley and a lever.

15. The arrangement of claim 1, wherein:
the actuator is supplied with energy in the form of at least one energy pulse.

16. The arrangement of claim 1, wherein:
the actuator is supplied with a single energy pulse of sufficient strength to transfer the at least one calibration weight from the rest position into the calibrating position, or vice versa, at the beginning of each movement phase.

17. The arrangement of claim 1, wherein:
the lifting system comprises at least one knee-joint linkage.

18. A method of checking and defining the state of a calibration weight arrangement, comprising the steps of:
a. providing a calibration weight arrangement with a bi-stable or tri-stable positioning element as defined by claim 1;
b. determining a reference signal value of the force-measuring cell and storing the reference signal value in memory with the position number one;
c. passing through each further stable position until the position of the reference signal value is reached again, determining a respective weighing signal value of the force measuring cell in each such stable position, and storing the respective weighing signal value with a position number in the order of sequence in which the stable position was passed through;
d. comparing the weighing signal values and the reference signal value with each other, determining the smallest signal value, and determining the position of the smallest signal value relative to the position of the reference value; and
e. passing through the stable positions of the bi-stable or tri-stable positioning element, starting from the position associated with the reference value, until the position with the smallest signal value has been reached.

* * * * *